FIG. I

INVENTORS.
ROBERT E. COX
JAMES F. SULLIVAN
BY

ATTORNEY

June 1, 1965     R. E. COX ETAL     3,186,496
REVERSIBLE DISK PLOW

Filed July 17, 1962     4 Sheets-Sheet 4

INVENTORS.
ROBERT E. COX
JAMES F. SULLIVAN
BY
*John C. Thompson*
ATTORNEY

United States Patent Office 3,186,496
Patented June 1, 1965

3,186,496
REVERSIBLE DISK PLOW
Robert E. Cox, Rock Island, and James F. Sullivan, East Moline, Ill., assignors to Deere & Company, Moline, Ill., a corporation of Delaware
Filed July 17, 1962, Ser. No. 210,343
13 Claims. (Cl. 172—211)

The present invention relates generally to agricultural implements and more particularly to disk plows of the tractor drawn reversible type.

The objects and general nature of the present invention is the provision of a reversible disk plow of the tractor drawn type and a plurality of disks supported on a swingable beam that can be swung from the right-hand plowing position to the left-hand plowing position, and vice versa, which beam also includes means for automatically changing the angle of the disk standards in the swingable beam, whereby, in either plowing position, the disks are disposed at the proper angle relative to the direction of travel.

A further feature of this invention is the provision of new and improved means for automatically reversing the rear furrow wheel so as to secure the necessary amount of lead to maintain the correct width of cut and to keep the plow running straight in either right-hand or left-hand plowing positions. More specifically, it is a feature of this invention to provide means for producing an accelerated movement of the rear wheel at the terminal portion of each reversal, link and lever means being provided on or connected with the reversible disk-carrying beam for this purpose.

A further feature of this invention is the provision of a new and improved means for raising and lowering the disks and the associated framework relative to the ground surface.

A still further object of this invention is the provision of a new and improved tail wheel assembly whereby the tail wheel is free to caster when the disks are in their raised position, and the tail wheel is held from castering when the disks are in their ground engaging position.

Another object of this invention is the provision of means to swing the disks from either a right-hand plowing position or a left-hand plowing position to the other of said positions.

Another object of this invention is the provision of means to raise and lower the disks and associated framework relative to the ground surface and interrelated means to swing the disks from either a right-hand or a left-hand plowing position to the other of said positions, the aforementioned means being interrelated in such a manner that a single source of power may be used to actuate both the raising means and the swinging means. More specifically, it is an object of this invention to provide in a tractor drawn reversible disk plow means for raising the plow and swinging the disks from one side to the other and control means interconnecting said raising means and said swinging means in such a manner that only a single power source need be employed to accomplish both functions.

Heretofore it has generally been necessary, when employing a tractor drawn reversible disk plow in which the plows are raised and reversed by hydraulic means, to employ a tractor having a dual function hydraulic system capable of independently operating two remote hydraulic cylinders, one cylinder being used to raise the disks and the other cylinder being employed to swing the disks from side to side. Therefore it is another object of this invention to provide means in apparatus of the class described whereby a tractor having only a single function hydraulic system may be employed to actuate hydraulic means on the implement to both raise the disks and reverse the plow.

These and other objects and advantages of the present invention will be apparent to those skilled in the art after a consideration of the following detailed description, taken in conjunction with the accompanying drawings in which.

In the accompanying description when the terms right-hand and left-hand are employed, it means from the position behind the plow and facing the front.

Figure 1:
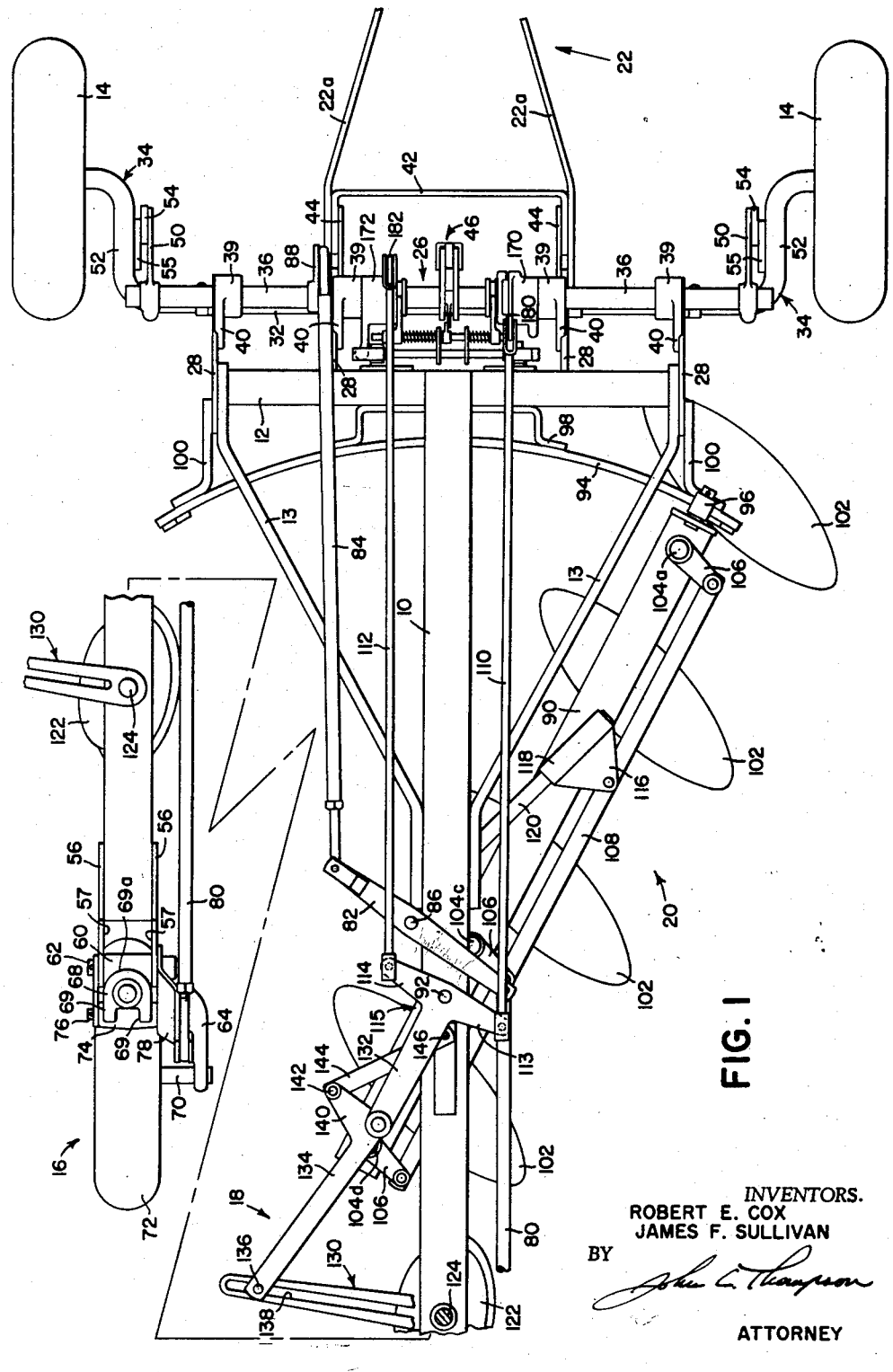
FIG. 1 is a plan view of a reversible disk plow in which the principles of the present invention have been incorporated, the plow being shown in a partially lowered position after the disks have been swung from the left-hand plowing position to the right-hand plowing position, the hydraulic power cylinder having been omitted for purposes of clarity.
Figure 2:
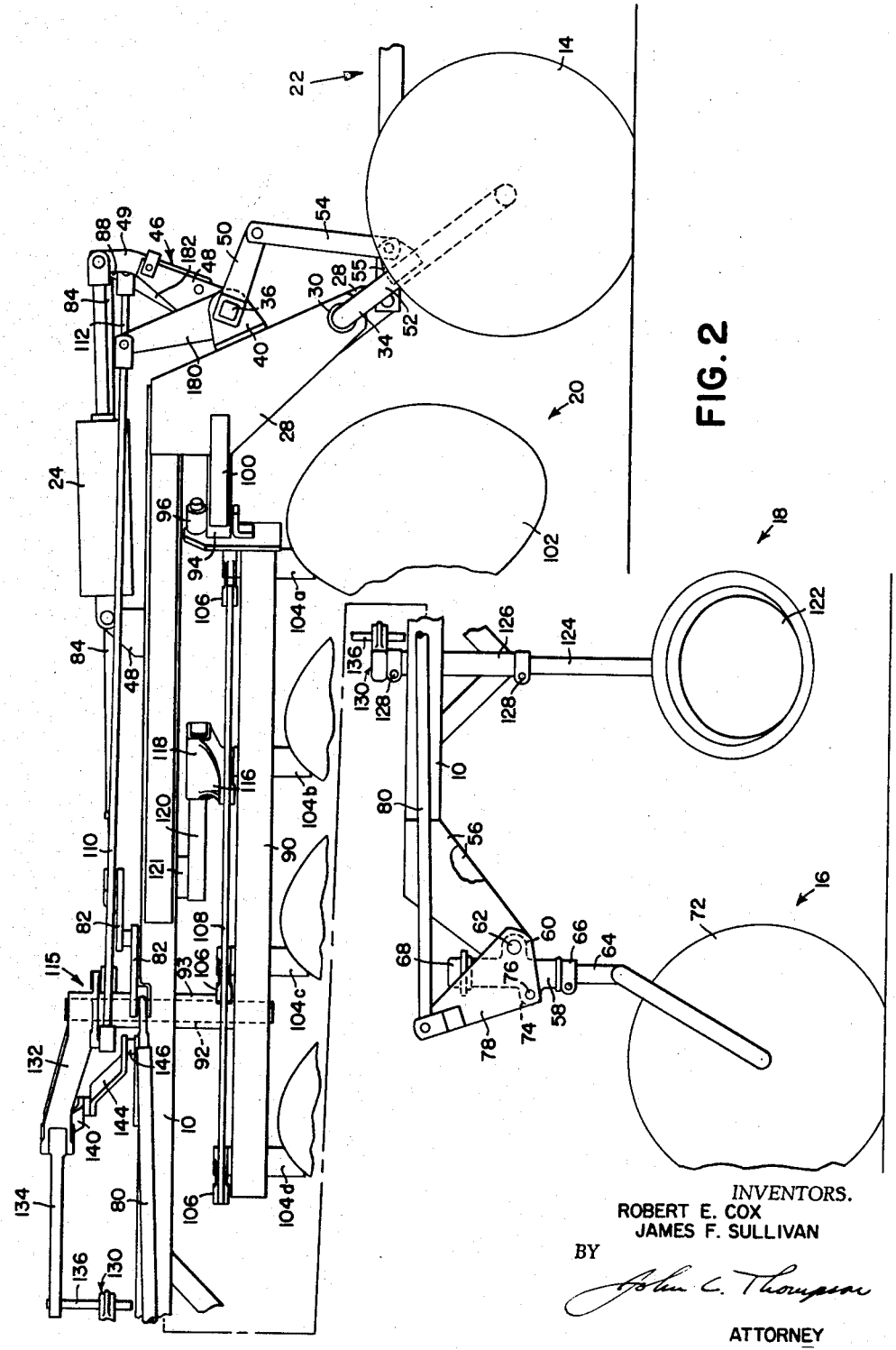
FIG. 2 is a side view of the reversible disk plow shown in FIG. 1.

Referring first to FIGS. 1 and 2, the reversible two-way trailing disk plow has a main box frame 10 to which is secured at the forward end a transverse box frame 12. Reinforcing members 13 are connected between the main frame 10 and the ends of the transverse frame 12. The plow includes laterally spaced support wheels 14, which are mounted in a suitable manner to the transverse box frame 12, a rear tail wheel assembly 16, which is carried on the rear of the box frame 10, a rear furrow wheel assembly 18, and a disk assembly or gang 20 which is mounted on an intermediate portion of the main box frame 10. A forwardly extending draft tongue assembly 22 is adapted to be hitched to a tractor (not shown) in a conventional manner. The wheels 14 and tail wheel assembly 16 are adapted to be moved up and down relative to the frame 10 to raise and lower the disk assembly 20, the raising and lowering of the disks being actuated through appropriate linkage by hydraulic cylinder 24 (FIG. 2). The hydraulic cylinder 24 also swings the disks from side to side by additional linkage means. A mechanical control mechanism indicated generally at 26 permits a single hydraulic cylinder to both raise and lower the plow and swing it from left to right and vice versa.

The laterally spaced apart support wheels 14 are rotatably mounted on the ends of a generally U-shaped axle 34. The bight portion 32 of the axle 34 is disposed within bearings 30 (FIG. 3) carried by the lower portion of forwardly and downwardly extending plates 28. These plates 28 are secured at their upper ends to intermediate portions and to end portions of the transverse box frame 12 as best illustrated in FIG. 1.

A rockshaft 36 is rotatably carried by rockshaft bearings 38 (FIG. 3) disposed within sleeves 39 on forwardly extending brackets 40, which are in turn secured to the plates 28. An upstanding rock arm 46 is rigidly secured to the center of the rockshaft and includes two spaced apart arm sections 47 and 48 rigidly fixed to the rockshaft 36. One end of the hydraulic cylinder 24 is pivotally secured to an arm 49 pivoted to the arm sections 47 and 48. The other end of the cylinder is pivotally secured to an upstanding lug 48 on frame 10, and extension or retraction of the double acting hydraulic cylinder 24 will cause the rockshaft 36 to be rotated within sleeves 39 when the arm 49 is pinned to the arm sections 47 and 48. Mounted on the ends of the rockshaft 36 are arms 50 which are connected to the legs 52 of the axle 34 through pivoted links 54 and brackets 55. As best shown in FIG. 2, retraction of the cylinder 24 will cause the rockshaft 36 to be rotated in a counterclockwise direction within bearing 38, and this rotational movement will be transmitted to the axles 34 through the arms 50, links 54 and brackets 55 thus causing the axles to be rotated in a counterclockwise direction within bearings 30 which in turn causes the front wheels to be moved upwardly relative to the gang 20. Similarly, extension of cylinder 24 would cause the rockshaft 36 to be rotated in a clockwise direction and the wheels to be forced downwardly relative to the gang 20.

The forwardly extending draft tongue assembly 22 is pivotally secured to the lower portion of the intermediate plates 28. A U-shaped brace 42 is secured between draft rails 22a, and bracing plates 44 are secured in turn to the brace 42.

The rear tail wheel assembly 16 includes two rearwardly and downwardly extending plates 56 secured to either side of the end of the main box frame 10. A vertical sleeve section 58 is provided with a forwardly disposed apertured lug 60 which rotatably receives a transversely extending pin 62 which is disposed in apertures in a lower rearward portion of the plate 56. The generally vertically disposed spindle 64 of the rear tail wheel assembly is received in the sleeve 58 and held from vertical movement within the sleeve by collar 66 and cap 68 which are nonrotatably secured to the spindle 64. Secured to the lower portion of the spindle 64 is a stub axle 70 (FIG. 1) which carries the rear tail wheel 72. The sleeve 58 is provided with a rearwardly disposed apertured lug 74 positioned slightly below the lug 60. A transverse pin 76 is rotatably disposed in the aperture in lug 74 and the right-hand end is received by the lower rearward portion of bell crank 78. The lower forward portion of bell crank 78 is pivotally engaged by the right-hand end of pin 62.

The rear portion of the longitudinally extending rear lifting link 80 is pivotally received in the upper portion of the bell crank 78. The forward portion of link 80 is pivotally secured to one end of an intermediate link 82, and the rear portion of the longitudinally extending forward lifting link 84 is pivotally secured to the other end of the intermediate link 82. The midportion of link 82 is pivotally carried by pin 86 which is secured to the main box frame 10. The forward portion of longitudinally extending forward lift link 84 pivotally secured to an auxiliary rock arm 88 on rockshaft 36.

Extension of the cylinder 24, as best shown in FIG. 2, will cause the link 84 to be moved forwardly, due to the clockwise rotation of the rockshaft 36 and forward movement of the arm 88, and the link 80 to be moved rearwardly due to the swinging movement of intermediate link 82 about pin 86. Rearward movement of link 80 causes the bell crank 78 to rotate about pivot pin 62 thereby rotatably moving the sleeve 58, spindle 64, and tail wheel 72 downwardly relative to the disks 20. Similarly, retraction of the cylinder 24 would cause the bell crank 78 to rotate in the opposite direction thus causing the tail wheel 72 to be moved upwardly relative to the disks 20.

It should be apparent from the preceding description that when the wheels 14, 72 are moved upward relative to the disk assembly 20, that, since the wheels remain in contact with the ground, the framework 10, 12 and gang 20 will be lowered relative to the ground. Similarly, when the wheels 14, 72 are moved downwardly relative to the gang 20, that the gangs will be moved upwardly relative to the ground.

When the disk assembly 20 is in its raised or transport position the rear tail wheel and spindle 64 are free to rotate within the sleeve 58. However it has been found desirable to hold the rear tail wheel from castering when the disks are in their plowing position since if the tail wheel 72 casters it may tend to move the plow to either the left or the right. Therefore the cap 68 has been provided with side walls 69 which will slidingly engage the inner faces 57 of plates 56. Since the cap 68 is nonrotatably secured to the spindle 64 the tail wheel 72 will not be able to caster when the cap 68 is disposed between the plates 56. The cap 68 is provided with a curved forward wall 69a which will tend to cam the cap 68 into the proper position between the plates 56 when the disks are lowered from their transport position to their ground engaging or plowing position.

The disks indicated generally at 20 are carried by a beam 90. A rearward portion of beam 90 is rigidly secured to the lower portion of spindle 92 which is rotatably disposed within a bearing sleeve 93 which is in turn secured to an intermediate portion of the main box frame 10. The forward portion of beam 90 is supported on an arcuate track 94 by roller 96. The track 94 is secured to the transverse box frame 12 by attaching members 98, 100, the member 98 being generally U-shaped and welded along its bight portion to the central portion of frame 12, and the attaching members 100 being secured to the plates 28.

The furrow openers or disks 102 are carried by standards 104a, 104b, 104c, and 104d which are pivotally received in beam 90. A single arm member 106 is fixed to the upper end of each of standards 104a, 104c and 104d. An angling link 108 pivotally interconnects the arms of all of the members 106 and is adapted to be moved longitudinally with respect to the beam 90 to properly angle the disks 102 when the plows are reversed from the right-hand position schematically shown in FIG. 7 to the left-hand position shown in FIG. 11 by means to be described below.

The beam 90 is reversed from the right-hand position to the left-hand plowing position by moving the right reversing link 110 forwardly while permitting the left reversing link 112 to move rearwardly. The links 110, 112 are pivotally connected at their rear ends to the right and left arms 113, 114 of the three arm crank 115 which is rigidly secured (as by keying) to the upper portion of spindle 92. Thus, when the right reversing link 110 is pulled forwardly (by means to be described below)

the left reversing link is caused to be pulled rearwardly by the crank 115.

When the beam 90 is shifted the angular position of the disks 102 is shifted by causing the angling link 108 to move longitudinally with respect to the beam 90. This is accomplished through a single arm casting 116 secured to the top of the second standard 104b. The outwardly projecting arm of the casting is pivoted to the angling link 108. The upper portion of the casting 116 is provided with a sleeve portion 118 which slidably receives a forward end portion of rod 120. The rear end of rod 120 is pivotally connected at 121 to the main box frame 10 forward of the spindle 92. Since the pivot 121 is ahead of the vertical axis defined by the spindle 92, about which the beam 90 swings, and by virtue of the fact that the rod 120 is disposed in the sleeve section 118 of the single armed casting 116 on standard 104b, whenever the beam 90 is shifted between the right- and left-hand plowing positions, the casting 116 experiences an angular displacement that is greater than the angular displacement experienced by the beam 90. Angular displacement of the casting 116 is transmitted by the angling link 108 to the single armed members 106. Thus, when the beam 90 is shifted from one position to the other, the disks 102 are angularly shifted through an extent greater than the angle through which the beam 90 is shifted.

The rear furrow assembly 18 includes a rear furrow wheel 122 which is adapted to be swung through approximately 200° when the disks are shifted between the right and left positions so that the furrow wheel will have the proper amount of lead when the disks are in either position. The wheel 122 is carried by spindle 124 which is passed through sleeve 126 which in turn is passed through and secured as by welding to the main box frame 10. The spindle 124 is vertically adjustable relative to the sleeve 126 and frame 10 by means of clamp collars 128. A slotted arm 130 is rigidly clamped to the top of the spindle 124, and when the plow is disposed to the right as shown in FIG. 1 the arm 130 projects to the left and slightly forwardly. The rear arm 132 of crank 115 pivotally carries an axle arm 134. The rear end of the arm 134 carries a depending rod 136 that extends downwardly through slot 138 in arm 130. The axle arm 134 has an outwardly projecting extension 140 fixed integrally therewith, and the outer portion of the extension 140 is apertured to receive a pin 142 by which the extension 140 is pivotally connected to one end of the link 144, the other end of which pivotally receives a stud or pin 146 located on the main box frame 10 at the rear of the spindle 92.

The length of the slot 138 and the effective radius of action of the arm or bar 134 are so proportioned that the rear furrow wheel 122 is swung through an angle such as is necessary to have the wheel disposed in the correct position or lead, both for right-hand plowing and left-hand plowing. It will be seen that the action of link 144 is to impart additional angular displacement to the arm 134 over and above that experienced by the arm 132 that is fixed directly to the vertical spindle shaft 92 to which the disk carrying beam 90 is fixed. For example, where the beam 90 swings through an angle of about 50°, which is ample so far as bringing the disks 102 to the desired position is concerned, the link 144 and the arm 134 are so arranged that the arm 130 that is fixed to the rear furrow wheel spindle 124 is shifted through an angle of about 200°, thus assuring that the rear furrow wheel will have the necessary amount of lead in either position of operation. When the disk assembly 20 is in the left position then the arm 130 will project to the right and slightly forwardly.

A mechanical control mechanism (indicated generally at 26) is provided to shift the rear furrow wheel and beam from the left to the right plowing position during one cycle of operation of the hydraulic cylinder 24, and then shift the rear furrow wheel and disk carrying beam from the right plowing position to the left plowing position during the next cycle of operation of the double acting hydraulic cylinder 24. Since the shifting of disk carrying beam 90 and the rear furrow wheel is controlled through right and left reversing links 110, 112 the control means are so arranged and constructed that when the hydraulic cylinder 24 is extended to raise the gang 20 only one of the links 110, 112 is operatively connected to the power cylinder 24 to shift the beam and furrow wheel, the other link being free to move. During lowering of the plow neither link is operatively connected to the extensible and retractable power means 24.

The control means 26 includes two laterally shiftable bars, 148, 150 (FIG. 3) which are shiftably received in apertures in mounting brackets 152. The mounting brackets 152 are connected to plates 154 which are secured to the transverse box frame 12 in a conventional manner. Rigidly secured to the first shiftable bar 148 are forwardly extending arms 156 whose forward ends slidably embrace the second shiftable bar 150. The arms 156 are spaced an equal distance from the center and the ends of the bar 148.

The first latching lug 158 is rigidly connected to the center of the second shiftable bar 150, and two forwardly extending arms 160 are rigidly secured to the second shiftable bar 150 at points spaced an equal distance from the latching lug 158 and from the ends of bar 150. Right- and left-hand compression springs 162, 164, respectively, are slidably disposed about the bar 150 and between forwardly extending arms 156 and forwardly extending arms 160, as best shown in FIG. 3.

Figure 3:
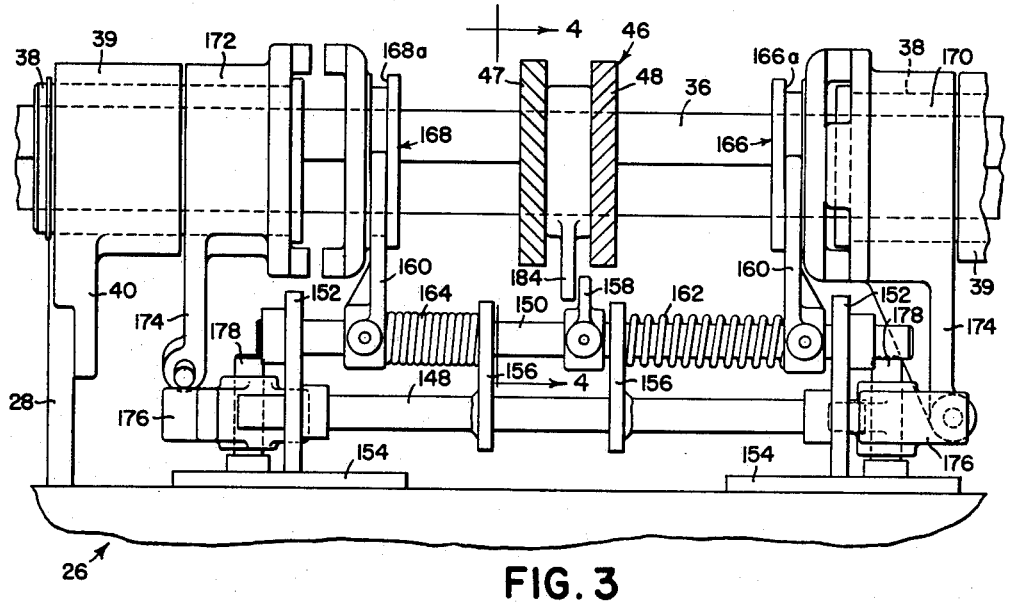
FIG. 3 is an enlarged view of applicants' novel mechanical control mechanism shown in FIG. 1, the parts being shown in the position that they occupy when the hydraulic cylinder has been fully extended when shifting the disks from their right-hand plowing position to their left-hand plowing position.
Figure 4:
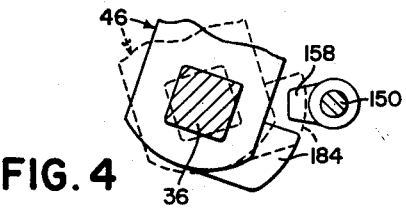
FIG. 4 is an enlarged view taken along the lines 4—4 in FIG. 3 showing the latching bars, the full line view illustrating their relative position when the plow is in its ground engaging position, and the dotted line view illustrating their relative position when the disks are in their raised postion.
Figure 5:
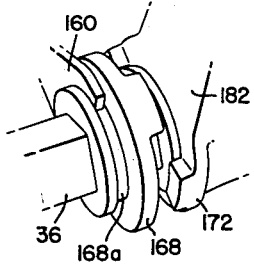
FIG. 5 is an enlarged fragmentary perspective view of a front portion of the plow showing the engaging dogs.
Figure 6:
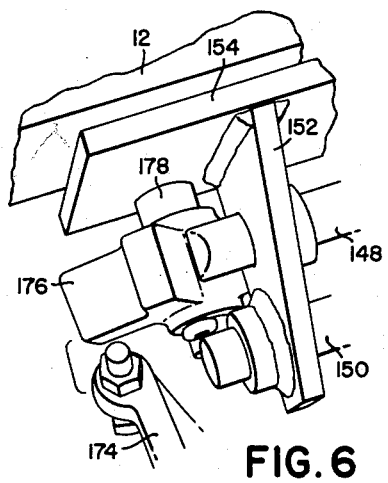
FIG. 6 is an enlarged fragmentary perspective view of a front portion of the plow showing the shiftable bar shifting mechanism.

As best shown in FIGS. 3 and 5, the forward ends of arms 160 embrace grooves 166a, 168a, in right- and left-hand dogs 166, 168, respectively; the dogs being shiftably, nonrotatably disposed on rockshaft 36. Castings 170, 172 are rotatably, nonshiftably disposed about the rockshaft 36, said castings being provided with dog engaging faces. Left- and right-hand movement of the shiftable bar 150 will cause the dogs 166, 168 to move into and/or out of contact with right- and left-hand castings 170, 172. The castings 170, 172 are rotatably journaled about the flanged bearings 38, and at their outer ends abut against the associated laterally inner sleeves 39. The castings 170, 172 are provided with downwardly and rearwardly projecting portions 174 which are adapted to engage pivoted elements 176 in the form of bell cranks that are rockably disposed upon pins 178 which project forwardly from the plates 154. The castings 170, 172 are also provided with upper projecting rock arms 180, 182, respectively, which are in turn pivotally interconnected with the right- and left-hand reversing links 110, 112 respectively. As best shown in FIGS. 3 and 4 the rockshaft 36 is provided with a centrally disposed second latching lug 184 which is adapted to become engaged with the first latching lug 158 on the second shiftable bar 150 during certain portions of the cycle.

Figure 7:
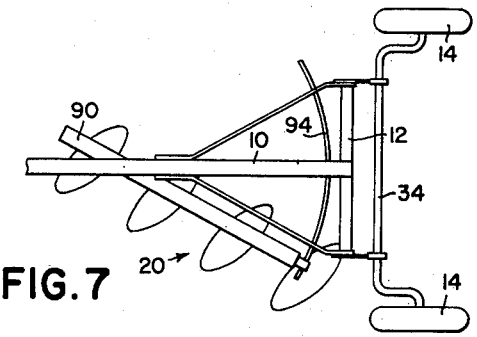
FIG. 7 is a reduced, somewhat schematic plan view of a portion of the plow built in accordance with the principles of this invention in which the disks are shifted to the right and are in their ground engaging position.
Figure 8:
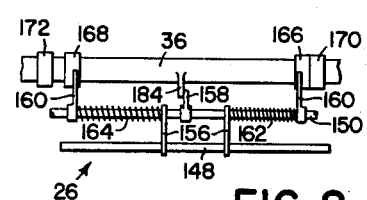
FIG. 8 is a somewhat enlarged schematic plan view of the control means showing their disposition when the plow is in the position illustrated in FIG. 7.

The operation of the reversible disk plow is best illustrated in FIGS. 7-14 where FIG. 7 shows the plow in its plowing position or down position with the gang 20 shifted to the right. In this position the mechanical control means 26 is disposed in the manner illustrated in FIG. 8 in which the shiftable bar 148 is held in its right-hand position by the forwardly disposed position of the left-hand arm 182 and the left-hand pivoted element 176, the right-hand arm 156 acting through compression spring 162 and the right-hand arm 160 to bias the right-hand dog 166 into engagement with the casting 170. Since the arms 160 are secured to the shiftable bar 150, the entire bar 150 is disposed to the right due to the compression spring 162 reacting against the right-hand arm 156. Therefore the latch 158 will be disposed to the right of the latch 184 and the dog 168 will be held out of engagement with the casting 172.

Figure 11:
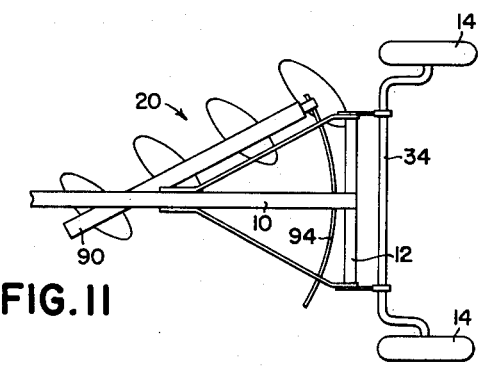
FIG. 11 shows the plow in its lowered position with the disks shifted to the left.
Figure 12:
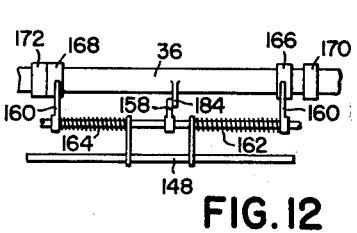
FIG. 12 shows the control means when the plow is in the position illustrated in FIG. 11.
Figure 13:
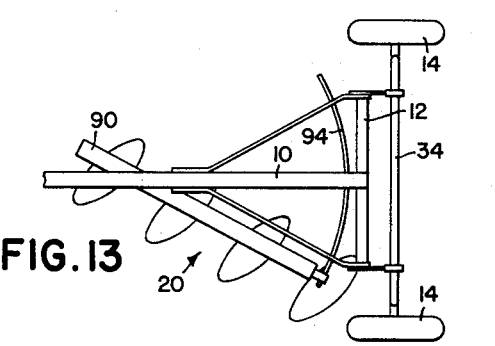
FIG. 13 shows the plow in its raised position after the disks have been shifted from their left-hand plowing position illustrated in FIG. 11 to their right-hand plowing position.
Figure 14:
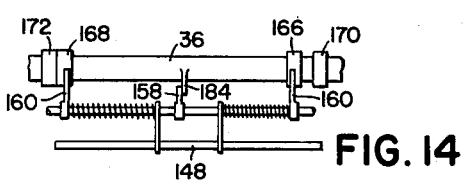
FIG. 14 shows the control means when the plow is in the position illustrated in FIG. 13.

To shift the plow from the down and to the right position illustrated in FIG. 7 to the down and to the left position illustrated in FIG. 11 it is only necessary to first extend the hydraulic cylinder 24, which causes the plow to be raised out of a ground engaging position and swung to the left, and then to retract the cylinder which causes the plow to be lowered into a ground engaging position, as shown in FIG. 11. When the cylinder 24 is extended the rockshaft 36 is caused to rotate in a clockwise direction as seen from FIG. 2. As described above, the extension of the cylinder 24 and corresponding clockwise rotation of the rockshaft 36 will cause the wheels 14, 72, to be forced downwardly, thus raising the frame 10, 12 and the disks 20.

As the cylinder is extended the castings 166, 168, which are shiftably, nonrotatably fixed to the rockshaft 36, are also caused to rotate, and continued forward movement of the cylinder will cause the side walls of the lugs on the elements 166 and 170 (the lugs being initially held in their disengaged position as best shown in the right hand portion of FIG. 3) to become engaged whereby further rotation of the rockshaft 36 will cause the right-hand rock arm 180 to move in a forward direction. As can be seen from the right-hand portion of FIG. 3 (where the right-hand clutch assembly 166, 170 is illustrated in its engageable position) the lugs are spaced circumferentially from each other a distance sufficient to permit the disks 20 to be raised out of engagement with the ground before the lugs become engaged. (See also FIG. 5 where the left-hand clutch assembly 168, 172 is shown in its disengaged position.) Before the disks are raised entirely out of engagement with the ground and also before the gang 20 is swung from the left-hand plowing position to the left-hand position the second latching lug 184 will become engaged with the first latching lug 158 as shown in the dotted line position in FIG. 4, due to the rotation of the rockshaft 36. Movement of the rock arm 180 in a forward direction will cause the right reversing link 110 to be pulled forwardly thereby rotating the three armed crank 115, the spindle 92 and the plow beam 90 all in a counterclockwise direction as viewed in FIG. 1, thus shifting the gang 20 from its right-hand position as illustrated in FIG. 7 to its left-hand position illustrated in FIG. 9. When the three arm crank 115 is caused to rotate, the rear furrow wheel 122 will be swung about 200° in the manner described above, and the link 112 will be pulled in a rearward direction causing the crank 182, casting 172 and the downwardly and rearwardly projecting arm 174 to rotate in a counterclockwise direction (FIG. 2), thus moving the left arm 174 out of engagement with the left-hand pivoted element 176. Thus the element 176 no longer biases the shiftable bar 148 to the right. Similarly, continued rotation of the rockshaft 36 will cause the right-hand downwardly and rearwardly projecting arm 174 on casting 170 to rotate into engagement with the right-hand pivoted element 176 causing the shiftable bar 148 to be shifted from its right-hand position illustrated in FIG. 8 to the left-hand position illustrated in FIGS. 10 and 3. Thus, when the hydraulic cylinder 24 is fully extended the mechanical control mechanism will be in the position illustrated in FIG. 10. In this position the bar 148 and its associated forwardly extending arms 156 have been shifted to the left position thus placing the spring 164 under considerably greater compression than the spring 162. Therefore the springs, one now being under greater compression than the other, acting on the left-hand arm 160 would tend to shift the bar 150 to the left, but this shifting action is restrained due to the engagement of the first and second latching lugs 158, 184 until the rotation of the shaft 36 carries the arm 184 out of engagement with the arm 158.

Figure 9:
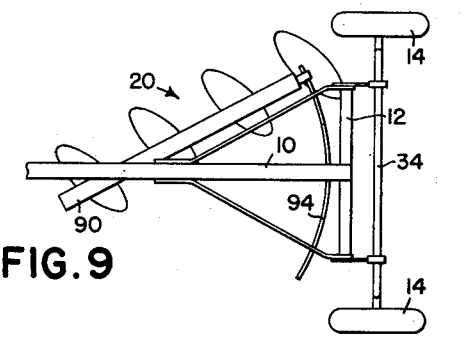
FIG. 9 is a view similar to FIG. 7 showing the plow in its raised position after the disks have been shifted to their left-hand position from their right-hand plowing position illustrated in FIG. 7.
Figure 10:
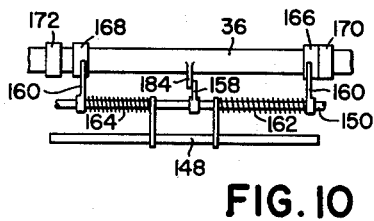
FIG. 10 is a view similar to FIG. 8, showing the disposition of the control means when the plow is in the position illustrated in FIG. 9.

To lower the disks 120 into their ground engaging position illustrated in FIG. 11 from the position illustrated in FIG. 9, it is only necessary to retract the hydraulic cylinder 24. This retraction will cause the wheels 14, 72 to be moved upwardly relative to the frame 10, 12 by the means fully described above, thus lowering the gang 20 into its down or ground engaging position. While the right-hand clutch assembly 166, 170 is initially held in its engaged position the rock arm will not be caused to be moved rearwardly during the counterclockwise rotation of the rockshaft 36 since the lugs on the dog 166 and casting 170 will be moved out of engagement with each other.

After the disks 20 have initially engaged the ground but before they have been fully lowered, the latch lugs 158, 184 will become disengaged. Since the right-hand pivoted element 176 is still biasing the shiftable bar 148 to the left (the frictional resistance to movement of the beam 90 and spindle 92 being sufficiently great to hold the element 176 from rotating due to the action of the spring 164 after the lugs on 166 and 170 become disengaged) the spring 164, reacting against the left arm 156, forces the left arm 160, the bar 150, and all parts carried thereby, into the left position illustrated in FIG. 12. Thus the dog 168 moves into contact with the casting 172 and the dog 166 moves out of contact with the casting 170.

To move the plow to the down and to the left position illustrated in FIG. 11 back to the down and to the right position illustrated in FIG. 7 substantially the same operation is followed as fully set forth above. The cylinder 24 is extended causing the disk assembly 20 to be raised partially and latches 158, 184 to become engaged. Further extension of the cylinder causes continued raising of the gang 20, and the link 112 to be pulled forwardly, thereby swinging the disk assembly 20 from the left- to the right-hand plowing position. Also during the extension of the cylinder the shiftable bar 148 will be shifted from the left to the right. When the cylinder has been fully extended the plow will assume the position schematically illustrated in FIG. 13 and the control means 26 will assume the position schematically illustrated in FIG. 14. Retraction of the cylinder 24 will then cause the latches 158, 184 to become disengaged, the shiftable bar 150 and the parts associated therewith to shift to the right to the position illustrated in FIG. 8, and finally for the plow to be moved to its fully lowered position illustrated in FIG. 7.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A reversible disk plow comprising a frame, a gang of disks mounted on said frame and swingable between right- and left-hand plowing positions, means to raise and lower said gang, means adapted to swing said gang from one of said positions to other of said positions, an expansible and retractable power source mounted on said frame, and control means operatively connecting said power source with said swinging means and said raising means, said control means including a rockshaft, a first rock arm mounted on said rockshaft, means interconnecting said first rock arm and said power source, a pair of clutches mounted on said rockshaft, means operable to engage one of said clutches and disengage the other of said clutches whereby only one of said clutches will be engaged at any one time, a pair of links, one end of each of said links being connected to said swinging means, and the other end of each of said links being connected to said clutches, and means interconnecting said rockshaft with said raising means.

2. In a reversible disk plow including a frame, a gang of disks mounted on said frame and swingable between right- and left-hand plowing positions, gang raising means, gang swinging means adapted to facilitate swinging of said gang from one of said positions to the other of said positions, an extensible and retractable means, means mounting one end of said extensible and retractable means on said frame, a rockshaft rotatably mounted on said frame, said rockshaft being provided with means engageable by said extensible and retractable means whereby said rockshaft can be rotated in response to movement of said extensible and retractable means, a pair of links, means securing one end of said links to said swinging means, means alternately connecting the other end of said links with said rockshaft, and means mounted on said rockshaft and adaptable to engage said gang raising means.

3. A reversible disk plow comprising a frame, generally vertically shiftable wheel means movably connected with said frame, a transverse shaft carried by said frame, power means connected to oscillate said shaft, means connecting said shaft means with said wheel means whereby oscillation of said shaft means serves to raise and lower said frame relative to said wheel means, a gang of disks connected with said frame for swinging movement relative thereto in a generally horizontal direction between right- and left-hand plowing positions, a pair of arms loosely mounted on said shaft and connected to shift said gang from one position to another, a pair of clutches on said shaft for optionally connecting said arms alternately with said shaft, means responsive to raising of said frame for biasing said clutches toward reversed position, and means responsive to lowering of said frame for reversing said clutches.

4. In a reversible disk plow, a frame, a gang shiftable laterally relative to said frame between right- and left-hand plowing positions, a transverse shaft, a pair of arms loosely mounted on said shaft, a pair of clutches operable for optionally connecting said arms with said shaft, spring biased means connected to be operated by rocking of said shaft for urging said clutches toward a position engaging one clutch and disengaging the other clutch, and means preventing operation of said spring biased means until said rockshaft has been rocked to a lowered position.

5. In a reversible disk plow, a frame, a gang shiftable laterally relative to said frame between right- and left-hand plowing positions, a transverse shaft, a pair of arms loosely mounted on said shaft, a pair of clutches operable for optionally connecting said arms with said shaft, a laterally movable part interconnecting said clutches to engage one and disengage the other when said part is moved in one direction or the other, means connected to shift said laterally movable part in one direction or the other, and means connected with arms for alternately shifting said part.

6. The invention set forth in claim 5, further characterized by said last mentioned means comprising spring means and movement delay means connected to prevent reversal of said clutch means until said transverse shaft has been moved to a given position.

7. The invention set forth in claim 6, further characterized by said movement delay means including an abutment on said laterally movable part and an abutment-engaging arm on said transverse shaft shiftable into a position engaging said abutment.

8. In a reversible disk plow, a frame, a gang shiftable laterally relative to said frame between right- and left-hand plowing positions, a transverse shaft, a pair of arms loosely mounted on said shaft, a pair of clutches operable for optionally connecting said arms with said shaft, means connecting said arms with said gang for shifting the latter, one arm being connected to shift the gang in one direction when one arm is shifted forwardly and the other arm being connected to shift the gang in the other direction when the other arm is shifted forwardly, and means connected with said clutches for reversing the latter in response to rocking movement of said transverse shaft.

9. The invention set forth in claim 8, further characterized by frame raising and lowering means connected with said transverse shaft, and a power cylinder connected with said shaft for rocking the latter through two ranges, movement through one range serving to raise and lower said frame and movement through the other range serving to shift said clutches.

10. A reversible disk plow comprising a frame, generally vertically shiftable wheel means connected with said frame, a generally laterally shiftable gang of disks carried by said frame and including a vertical shaft, a lever fixed at a midpoint to the upper end of said shaft, a pair of links pivotally connected at their rear ends to opposite ends, respectively, of said lever and extending forwardly toward the front of said frame, a rockshaft carried in transverse position on the forward portion of said frame, arm means on said rockshaft connected with said wheel means for raising and lowering said frame means relative thereto in response to rocking of said rockshaft, a pair of arms loosely mounted on said rockshaft and connected, respectively, with the forward ends of said links, a pair of alternately operable clutches for connecting one or the other of said arms with said rockshaft, a power cylinder mounted on said frame, an arm connected with said cylinder and fixed to said rockshaft, and means connected to be operated by one or the other of said arms for reversing said clutches.

11. A reversible disk plow as defined in claim 10, further characterized by said clutch-reversing means comprising a movable part connected to shift said clutches between a first position, in which one clutch is engaged and the other clutch disengaged, and a second position, in which said one clutch is disengaged and said other clutch is engaged, resilient means operated by one or the other of said arms for shifting said movable part and means actuated by said rockshaft for holding said movable part against movement until said rockshaft is moved into a given position.

12. A reversible disk plow as defined in claim 11, further characterized by said movable part including a cross bar slidably carried by said frame alongside said rockshaft and having an arm at each end connected to shift the adjacent clutch, a pair of bell cranks mounted on said frame, one adjacent each of said loosely mounted arms, said rockshaft actuated means including a second movably mounted part carried by said frame adjacent said first mentioned movably mounted part and positioned to be shifted laterally by one or the other of said bell cranks, a pair of springs mounted on said cross bar and acting against said clutches, respectively, and said holding means including a lug on the central portion of said first mentioned movable part and a second lug on said rockshaft cooperating with said first lug for holding said first mentioned movable part against movement until said rockshaft has been rocked to a given position.

13. A tail wheel assembly comprising: a frame including a pair of longitudinally extending spaced apart substantially parallel plates, a sleeve member having a portion pivotally journaled about a generally transverse axis between said plates, a spindle carrying a tail wheel at its lower end thereof, an upper portion of said spindle being disposed within said sleeve, means to pivotally move said sleeve with respect to said plates whereby said tail wheel is caused to be moved up and down relative to the frame, and a cap secured to an upper portion of said spindle and disposed above said sleeve, said cap having parallel flat sides engageable between said plates to hold said spindle from rotating within said sleeve when said tail wheel is in its up position, and said cap being provided with a forward cam shaped portion to cam said cap between said plates when said tail wheel is moved from its down position to its up position, the parts being so arranged and constructed that the spindle is permitted to rotate when said tail wheel is in its down position.

(References on following page)

References Cited by the Examiner

UNITED STATES PATENTS

| | | | |
|---|---|---|---|
| 2,163,832 | 6/39 | Coviello | 172—211 |
| 2,490,656 | 12/49 | Seaholm | 172—386 |
| 2,682,822 | 7/54 | Toland | 172—386 |
| 2,818,007 | 12/57 | Silver et al. | 172—212 |
| 3,045,765 | 7/62 | Cox et al. | 172—212 |

FOREIGN PATENTS 622,678  5/49  Great Britain.

T. GRAHAM CRAVER, *Primary Examiner*.

CARL W. ROBINSON, *Examiner*.